United States Patent
Tozuka et al.

(10) Patent No.: US 8,828,589 B2
(45) Date of Patent: Sep. 9, 2014

(54) BATTERY AND METHOD OF MANUFACTURING SAME

(75) Inventors: Kazuhide Tozuka, Kyoto (JP);
Masakazu Tsutsumi, Kyoto (JP);
Katsuhiko Okamoto, Kyoto (JP);
Yoshinori Tanaka, Kyoto (JP);
Shinsuke Yoshitake, Kyoto (JP);
Takeshi Sasaki, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 392 days.

(21) Appl. No.: 13/002,155

(22) PCT Filed: Jul. 2, 2009

(86) PCT No.: PCT/JP2009/062152
§ 371 (c)(1),
(2), (4) Date: Feb. 17, 2011

(87) PCT Pub. No.: WO2010/001975
PCT Pub. Date: Jan. 7, 2010

(65) Prior Publication Data
US 2011/0159356 A1 Jun. 30, 2011

(30) Foreign Application Priority Data
Jul. 2, 2008 (JP) .................................. 2008-173476

(51) Int. Cl.
*H01M 2/26* (2006.01)
*H01M 10/04* (2006.01)
*H01M 10/05* (2010.01)

(52) U.S. Cl.
CPC .......... *H01M 2/263* (2013.01); *H01M 10/0431* (2013.01); *H01M 10/05* (2013.01); *Y02E 60/12* (2013.01)
USPC ............................ 429/161; 429/178; 429/179

(58) Field of Classification Search
CPC ....................................................... H01M 2/26
USPC ........................................... 429/161, 178, 179
See application file for complete search history.

(56) References Cited

U.S. PATENT DOCUMENTS

| 2005/0287429 A1 | 12/2005 | Cho et al. ....................... 429/161 |
| 2005/0287431 A1 | 12/2005 | Cho ............................... 429/161 |
| 2006/0024578 A1* | 2/2006 | Lee ................................ 429/208 |

FOREIGN PATENT DOCUMENTS

| JP | 09-082305 | 3/1997 |
| JP | 11-250893 | 9/1999 |

(Continued)

OTHER PUBLICATIONS

Machine Translation of JP 2006-236790 published to Yokoyama et al. on Sep. 7, 2006.*

(Continued)

*Primary Examiner* — Jonathan G Leong
(74) *Attorney, Agent, or Firm* — J.C. Patents

(57) ABSTRACT

It is an object of the present invention to provide a battery in which current collecting connector 2 and 3 and groups 1*d* and 1*e* of metal foil of a power generating element 1 can be easily connected, respectively, and a method of manufacturing the same. First plate portions 2*b* and 3*b* which respective protruding ends of metal foil of the groups 1*d* and 1*e* of metal foil of the power generating element 1 come in contact with or close to and second plate portions 2*c* and 3*c* protruding from the first plate portions 2*b* and 3*b* toward the power generating element 1 and disposed only at one outer side portions of the groups 1*d* and 1*e* of metal foil are provided to the other portions of the current collecting connectors 2 and 3 of the invention and the groups 1*d* and 1*e* of metal foil are welded to the second plate portions 2*c* and 3*c*.

7 Claims, 4 Drawing Sheets

(56) References Cited

FOREIGN PATENT DOCUMENTS

| | | |
|---|---|---|
| JP | 2002-100340 | 4/2002 |
| JP | 2002-279961 | 9/2002 |
| JP | 2005-285773 | 10/2005 |
| JP | 2006-236790 | 9/2006 |

OTHER PUBLICATIONS

Supplementary European Search Report of European Application No. 09 77 3553, dated May 20, 2011.

* cited by examiner

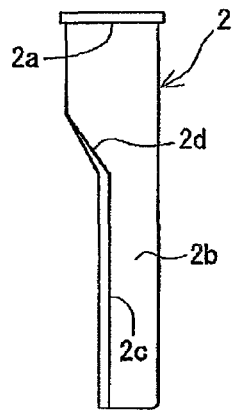
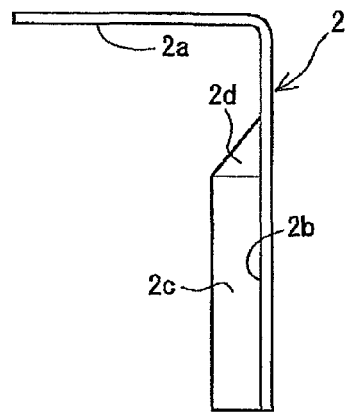
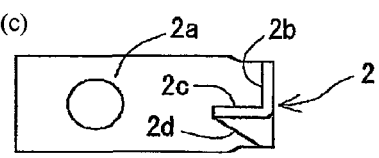
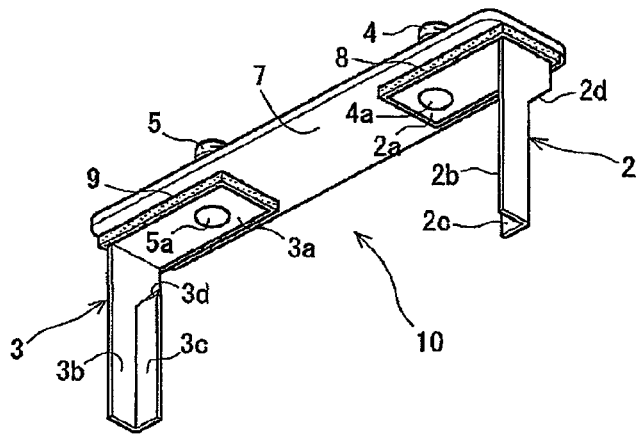

BATTERY AND METHOD OF MANUFACTURING SAME

The present invention relates to a battery in which groups of metal foil protruding from end portions of a power generating element and terminals are connected with current collecting connectors interposed therebetween and a method of manufacturing the same.

TECHNICAL FIELD

The present invention relates to a battery in which groups of metal foil protruding from end portions of a power generating element and terminals are connected with current connecting connectors interposed therebetween and a method of manufacturing the same.

BACKGROUND ART

FIG. 7 shows an example of an elliptic cylindrical winding power generating element 1 used for a nonaqueous electrolyte secondary battery. The power generating element 1 is formed by winding a positive electrode 1a and a negative electrode 1b into an elliptic cylindrical shape with separators 1c interposed therebetween. The positive electrode 1a is formed by loading positive active material (a dot-hatched portion) on a surface of a strip of aluminum foil as a substrate and the negative electrode 1b is formed by loading negative active material (a dot-hatched portion) on a surface of a strip of copper foil as a substrate. The positive electrode 1a includes an uncoated portion not coated with the positive active material at an edge portion on a right side in the drawing of the strip of aluminum foil and the negative electrode 1b includes an uncoated portion not coated with the negative active material at an edge portion on a left side in the drawing of the strip of copper foil. By winding the positive electrode 1a and the negative electrode 1b with the separators 1c interposed therebetween while displacing the positive electrode 1a rightward and the negative electrode 1b leftward, only the aluminum foil of the uncoated portion of the positive electrode 1a is wound in layers and protrudes as a group 1d of metal foil from the separators 1c at the right end portion of the power generating element 1 and only the copper foil of the uncoated portion of the negative electrode 1b is wound in layers and protrudes as a group 1e of metal foil from the separators 1c at the left end portion.

One of methods of connecting the group 1d (and the group 1e, similarly) of metal foil of the power generating element 1 to a terminal is to insert a connecting plate portion provided to the other end portion of a current collecting connector, which is connected at its one end portion to the terminal, into a central core portion of the group 1d of metal foil protruding into an elliptic cylindrical shape and to weld the metal foil of the group 1d of metal foil on opposite sides to the connecting plate portion (see Patent Document 1, for example).

Another method of connecting the group 1d (and the group 1e, similarly) of metal foil of the power generating element 1 to the terminal is to divide layers of metal foil of the group 1d to pinch the divided layers of metal foil in V-shaped connecting portions provided to the other end portion of the current collecting connector, which is connected at its one end portion to the terminal, and to weld the metal foil to the connecting portions (see Patent Document 2, for example).

Furthermore, another method of connecting the group 1d (and the group 1e, similarly) of metal foil of the power generating element 1 to the terminal is to bring respective protruding ends of metal foil of the group 1d into contact with the connecting plate portion provided to the other end portion of the current collecting connector, which is connected at its one end portion to the terminal, and to weld the protruding ends to the connecting plate portion (see Patent Document 3, for example).

PRIOR ART DOCUMENTS

Patent Documents

Patent Document 1: Japanese Patent Application Laid-open No. 2006-236790
Patent Document 2: Japanese Patent Application Laid-open No. 2002-279961
Patent Document 3: Japanese Patent Application Laid-open No. 2002-100340 (paragraphs 0119 to 0123, FIGS. 23 and 24)

DISCLOSURE OF INVENTION

Problems to be Solved by the Invention

However, in the case of the current collecting connector in the Patent Document 1, insertion of the connecting plate portion into the core portion of the group 1d of metal foil of the power generating element 1 is required before welding. If the connecting plate portion comes in contact with the metal foil (aluminum foil or copper foil) of the group 1d of metal foil in the inserting work, the metal foil easily bends and ruptures to increase electric resistance of the welded portion. To avoid this, it is necessary to carefully carry out the work, which reduces workability. If the current collecting connectors for a positive electrode and a negative electrode are mounted to a lid plate of a battery container in advance to form a lid assembly, the connecting plate portions of the current collecting connectors cannot be inserted into the core portions of the groups 1d and 1e of metal foil at opposite end portions of the power generating element 1. Therefore, at least one of the group 1d of metal foil and the group 1e of metal foil needs to be welded to the connecting plate portion of the current collecting connector in advance. In this case, the power generating element 1 obstructs mounting of the current collecting connectors to the lid plate and complicates the mounting work.

Furthermore, the current collecting connector in the Patent Document 2 requires division of the layers of metal foil of the group 1d of the power generating element 1 and pinching the divided layers of metal foil in the V-shaped connecting portions before welding. If the V-shaped connecting portions press or push away the metal foil of the group 1d of metal foil in the pinching work, the metal foil easily bends or ruptures to increase electric resistance of the welded portions. To avoid this, it is necessary to carefully carry out the work, which reduces workability.

In the case of the current collecting connector in the Patent Document 3, the connecting plate portion and the protruding end of the metal foil orthogonal to the connecting plate portion are connected by welding and therefore the connection is likely to be unstable. Moreover, because the protruding end of the metal foil is welded, burrs are likely to be formed or metal powder is likely to scatter to cause internal short-circuit in the battery.

It is an object of the present invention to provide a battery in which current collecting connectors and groups of metal foil can be easily connected by providing first plate portions for positioning and second plate portions for connection to the current collecting connectors, bringing protruding ends of the metal foil of the groups of metal foil protruding from end portions of a power generating element in contact with or close to the first plate portions, and joining the groups of metal foil to the second plate portions disposed on outer side portions and a manufacturing method of the battery.

Means for Solving Problems

In a battery according to claim 1 and in which layers of metal foil which are substrates of electrodes protrude as groups of metal foil from an end portion of a power generating element and current collecting connectors having one portions connected to terminals are connected at the other portions thereof to the groups of metal foil, first plate portions which respective protruding ends of metal foil of the groups of metal foil come in contact with or close to and second plate portions protruding from the first plate portions toward the power generating element and disposed only at one outer side portions of the groups of metal foil are provided to the other portions of the current collecting connectors and the groups of metal foil are joined to the second plate portions.

In a battery according to claim 2, the power generating element in claim 1 has layers of metal foil, which are substrates of a positive electrode and a negative electrode, protruding as groups of metal foil from different end portions and the current collecting connectors are for the positive electrode and the negative electrode and have the one portions connected to a positive terminal and a negative terminal mounted to a lid plate for closing an opening portion of a battery container for housing the power generating element.

In a battery according to claim 3, the second plate portions of the current collecting connectors in claim 1 are provided only at central portions of the one outer side portions of the groups of metal foil in a direction along the side portions.

In a battery according to claim 4, the second plate portions of the current collecting connectors in claim 2 are provided only at central portions of the one outer side portions of the groups of metal foil in a direction along the side portions.

In a battery according to claim 5, the second plate portions of the current collecting connectors in claims 1 to 4 are disposed in positions of the one outer side portions of the groups of metal foil and displaced toward center sides of the layers of metal foil by pushing and gathering the metal foil on one sides of the groups of metal foil toward the center sides of the layers.

A method of manufacturing a battery according to claim 6 includes the steps of: forming a lid assembly by respectively mounting one portions of current collecting connectors for a positive electrode and a negative electrode to a lid plate; inserting and disposing a power generating element having layers of metal foil, which are substrates of the positive electrode and the negative electrode, protruding as groups of metal foil from different end portions between first plate portions respectively provided to the other portions of the current collecting connectors for the positive electrode and the negative electrode of the lid assembly; respectively bringing respective protruding ends of the metal foil of the groups of metal foil into contact with or close to the first plate portions and disposing second plate portions, protruding toward the power generating element from the first plate portions, only at one outer side portions of the groups of metal foil; respectively joining the groups of metal foil to the second plate portions of the current collecting connectors for the positive electrode and the negative electrode; and housing the power generating element in a battery container together with the current collecting connectors of the lid assembly and for the positive electrode and the negative electrode and closing an opening portion of the battery container with the lid plate of the lid assembly.

Effects of the Invention

According to the invention of claim 1, by bringing the respective protruding ends of the metal foil of the groups of metal foil in contact with or close to the first plate portions of the current collecting connectors, the current collecting connectors and the power generating element can be positioned easily. At this time, because the second plate portions of the current collecting connectors are disposed at the one outer side portions of the groups of metal foil, joining work such as welding for connection to the groups of metal foil can be carried out easily. Moreover, the second plate portions are disposed only on one sides of the one outer side portions of the groups of metal foil and no component members of the current collecting connectors are disposed on the other sides and therefore it is unnecessary to insert the groups of metal foil having the layers of metal foil between the second plate portions and other component members of the current collecting connectors and there is no fear of bend and rupture of the metal foil. Moreover, it is unnecessary to insert the second plate portions of the current collecting connectors between the respective layers of metal foil of the groups of metal foil and therefore there is no fear of bend and rupture of the metal foil. Furthermore, the second plate portions of the current collecting connectors are joined not to the protruding ends of the metal foil of the groups of metal foil in contact with or close to the first plate portions but base portion sides of the groups of metal foil by welding or the like and therefore burrs are not formed at the protruding ends of the metal foil and metal powder does not scatter.

According to the invention of claim 2, it is possible to easily connect the current collecting connectors for the positive electrode and the negative electrode mounted to the lid plate to the power generating element having the groups of metal foil for the positive electrode and the negative electrode and protruding from opposite end portions.

According to the inventions of claims 3 and 4, because the second plate portions are disposed only at the central portions of the outer side portions of the groups of metal foil, joining such as welding can be carried out at portions where the metal foil is in layers without fail. Moreover, in a case of a wound power generating element, the second plate portions are not disposed at opposite curved portions of the groups of metal foil where the metal foil is curved, which provides adequate spaces not to apply stress to the opposite curved portions.

If the groups of metal foil are joined to the second plate portions by welding or the like, the respective layers of metal foil are pushed and gathered to come in close contact with surfaces of the second plate portions. Therefore, if the second plate portions are disposed in positions along the layer of metal foil which is the closest to one side, the layer of metal foil which is the closest to the other side is pushed and gathered toward the one side over extremely long distances, receives excessive tension, and may rupture. However, according to the invention in claim 5, the second plate portions are disposed in the position displaced toward the center side of the layers of metal foil and therefore the layer of metal foil which is the closest to the one side and the layer of metal foil which is the closest to the other side are pushed and gathered toward the center side through substantially halves of the distance and, as a result, it is possible to correct imbalance in tension applied to the metal foil to thereby prevent application of excessive tension to part of the metal foil.

According to the invention in claim 6, because the lid assembly is formed by mounting the current collecting connectors for the positive electrode and the negative electrode to the lid plate before connection to the power generating element which is heavy and needs to be treated carefully (by respectively mounting them by connecting them to the positive terminal and the negative terminal, if the positive terminal and the negative terminal are mounted), the connecting work of the current collecting connectors and the terminals by caulking or welding becomes easy. Moreover, because the second plate portions of the current collecting connectors are respectively disposed at the one outer side portions (not necessarily on the same side of the positive side and the negative side) of the groups of metal foil of the positive electrode and the negative electrode of the power generating element by merely inserting and disposing the power generating element between the first plate portions of the current collecting connectors of the lid assembly and for the positive electrode and the negative electrode, joining work such as welding can be carried out easily by easy positioning. Furthermore, because the second plate portions of the current collecting connectors do not need to be inserted between the respective layers of metal foil of the groups of metal foil, there is no fear of bend and rupture of the metal foil. Because the second plate portions are joined to the base portion sides of the groups of metal foil by welding or the like, burrs are not formed at the protruding ends of the metal foil and metal powder does not scatter.

BRIEF DESCRIPTION OF DRAWINGS

FIGS. 2(a), 2(b), and 2(c) are a left side view, a front view, and a back view showing the embodiment of the invention and showing a structure of a current collecting connector for a positive electrode;

FIG. 3 is a look-up perspective view showing the embodiment of the invention and showing a lid assembly;

BEST MODE FOR CARRYING OUT THE INVENTION

The best mode for carrying out the present invention will be described below with reference to FIGS. 1 to 6.

Figure 1:
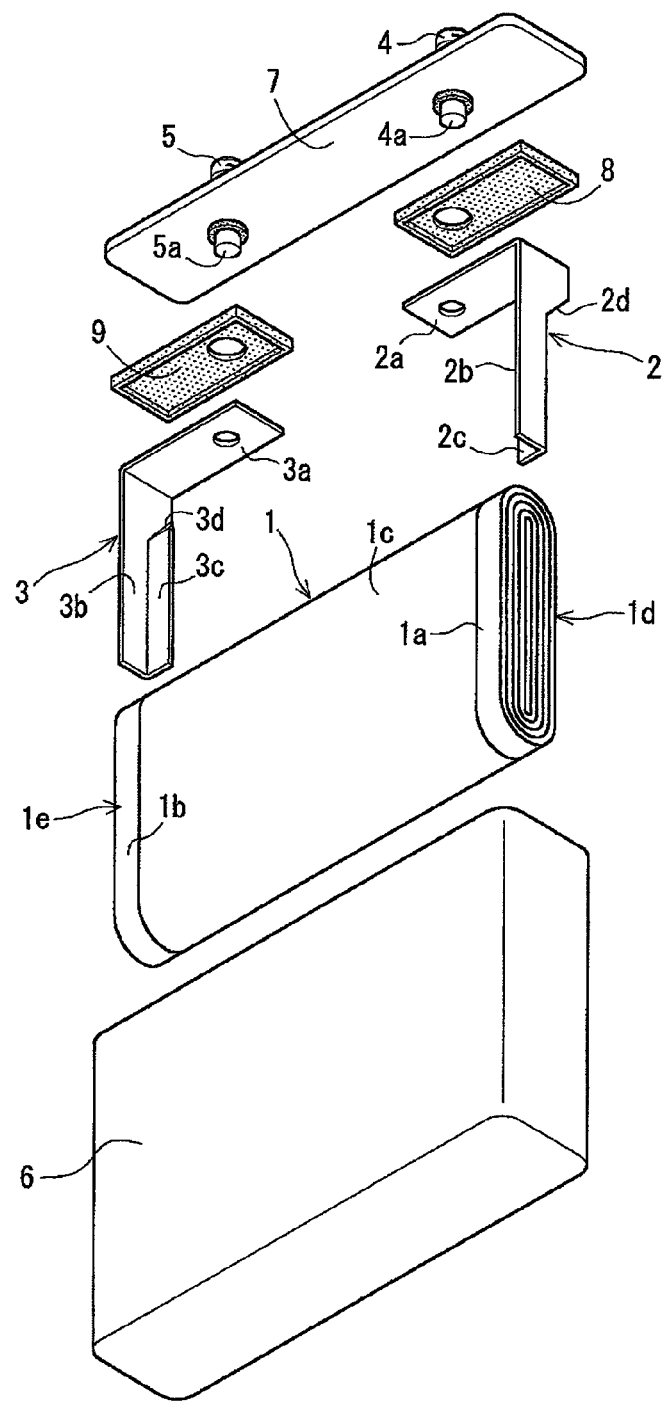
FIG. 1 is an exploded look-down perspective view showing an embodiment of the present invention and showing a structure of a nonaqueous electrolyte secondary battery.
Figure 7:
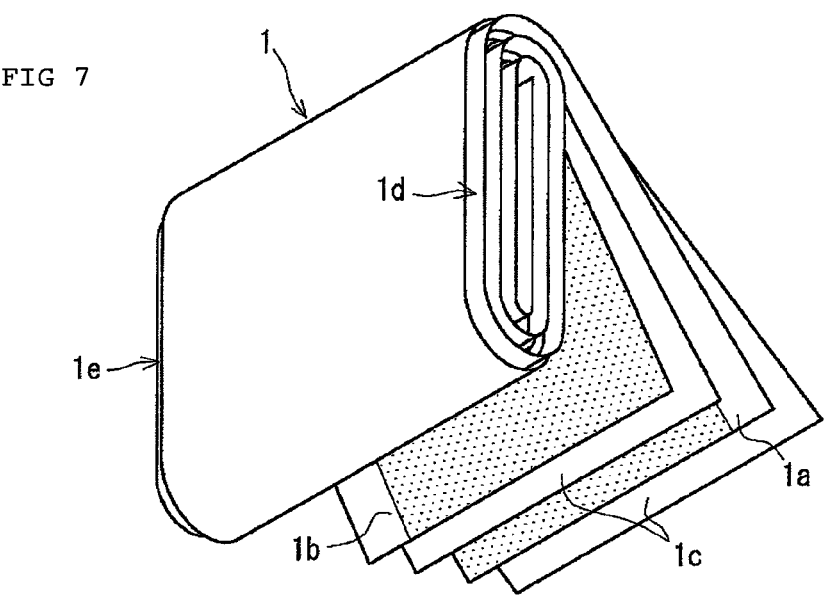
FIG. 7 is a look-up perspective view showing a structure of an elliptic cylindrical winding power generating element used for the nonaqueous electrolyte secondary battery.

In the embodiment, as shown in FIG. 1, a nonaqueous electrolyte secondary battery using an elliptic cylindrical winding power generating element 1 will be described. The power generating element 1 is formed by winding a positive electrode 1a and a negative electrode 1b into an elliptic cylindrical shape with separators 1c interposed therebetween and a group 1d of metal foil in which metal foil of the positive electrode 1a is wound in layers and a group 1e of metal foil in which metal foil of the negative electrode 1b is wound in layers protrude respectively from right and left opposite end portions in the same manner as in FIG. 7.

The power generating element 1 is connected to a positive terminal 4 and a negative terminal 5 with a current collecting connector 2 for the positive electrode and a current collecting connector 3 for the negative electrode interposed therebetween. Moreover, the power generating element 1 is housed together with the current collecting connectors 2 and 3 in a rectangular box-shaped battery container 6 made of an aluminum alloy and an upper end opening portion of the battery container 6 is closed with a rectangular lid plate 7 made of an aluminum alloy. The positive terminal 4 and the negative terminal 5 are mounted to the lid plate 7.

The current collecting connector 2 for the positive electrode is formed by bending a rectangular aluminum plate and the current collecting connector 3 for the negative electrode is formed by bending a rectangular copper plate. The current collecting connector 2 for the positive electrode is formed by horizontally disposing the rectangular aluminum plate so that its longitudinal direction is in a lateral direction and forming a through hole at a left portion (one portion of the current collecting connector 2) to thereby form a terminal connecting portion 2a and bending a right portion (the other portion of the current collecting connector 2) down in a vertical direction to thereby form a first plate portion 2b for positioning, as shown in FIG. 2. Moreover, a back side of the vertical first plate portion 2b excluding the upper end portion is bent leftward into an L-shape to protrude and this portion protruding leftward is used as a second plate portion 2c for connection. The second plate portion 2c is formed by bending a portion of the rectangular aluminum plate slightly narrower than a half of an original width of the aluminum plate. Moreover, between an upper end of the second plate portion 2c and an upper end portion of the first plate portion 2b having the original width of the rectangular aluminum plate, a triangular inclined portion 2d protruding further leftward as it extends downward is formed.

Because shapes of the current collecting connector 3 for the negative electrode and the current collecting connector 2 for the positive electrode are bilaterally symmetric, the current collecting connector 3 will not be described in detail. Although the copper plate is used instead of the aluminum plate and a lateral orientation is opposite, the current collecting connector 3 has a terminal connecting portion 3a, a first plate portion 3b, a second plate portion 3c, and an inclined portion 3d having similar structures to those of the current collecting connector 2. As the current collecting connector 3 for the negative electrode, one having the same shape as the current collecting connector 2 for the positive electrode can be used while laterally reversed.

The positive terminal 4 and the negative terminal 5 are disposed at right and left end portions of an upper face of the lid plate 7 with insulating sealing materials (not shown) interposed therebetween, respectively. Moreover, caulking pins 4a and 5a protrude downward from lower faces of the positive terminal 4 and the negative terminal 5 and protrude downward through holes in the lid plate 7 with their peripheries covered with sleeve-shaped portions of the insulating sealing materials.

Figure 4:
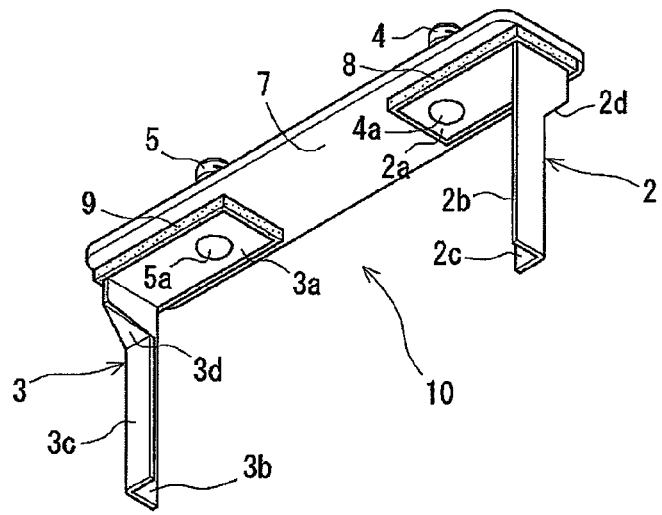
FIG. 4 is a look-up perspective view showing the embodiment of the invention and showing a lid assembly using other current collecting connectors.

The terminal connecting portions 2a and 3a of the current collecting connectors 2 and 3 are disposed at right and left end portions of a lower face of the lid plate 7 with the insulating sealing materials 8 and 9 interposed therebetween, respectively, as shown in FIG. 3. Then, the caulking pins 4a and 5a of the positive terminal 4 and the negative terminal 5 protrude further downward through the through holes in the terminal connecting portions 2a and 3a and lower end portions of the caulking pins 4a and 5a are caulked from below. In this way, a lid assembly 10 in which the current collecting connector 2 for the positive electrode, the positive terminal 4, the current collecting connector 3 for the negative electrode, and the negative terminal 5 are connected to the lid plate 7 while insulated is formed. If this lid assembly 10 is formed in advance, it is possible to carry out assembly and caulking separately from the power generating element 1 which requires special care to treat metal foil and active materials of the positive electrode 1a and the negative electrode 1b and therefore it is possible to improve productivity of the non-aqueous electrolyte secondary battery. FIG. 4 shows an example of the lid assembly 10 in which the current collecting connector 3 for the negative electrode has the same shape as the current collecting connector 2 for the positive electrode and used while laterally reversed as described above.

Figure 5:
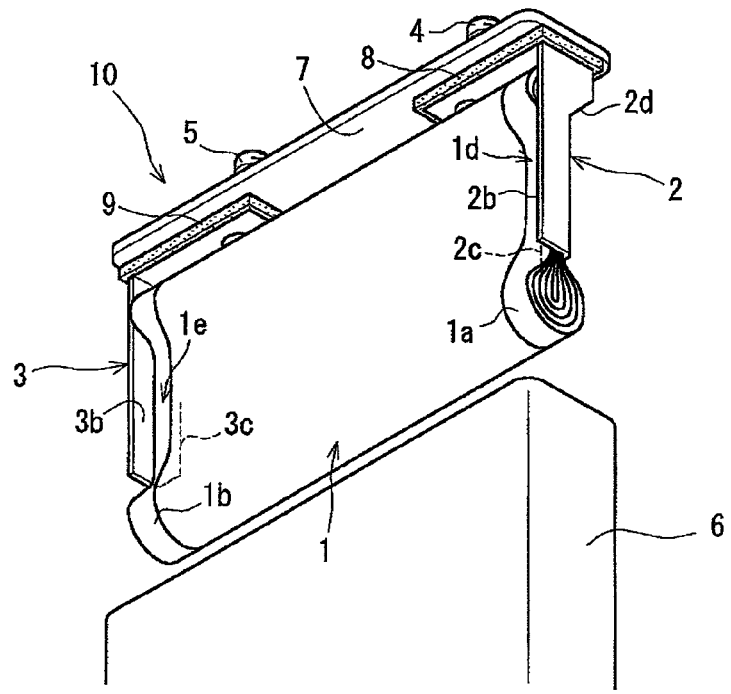
FIG. 5 is an exploded look-up perspective view showing the embodiment of the invention and showing a structure of an nonaqueous electrolyte secondary battery in which a power generating element is mounted to the lid assembly.

Between the first plate portions 2b and 3b of the current collecting connectors 2 and 3 for the positive electrode and the negative electrode in the lid assembly 10 shown in FIG. 3, the power generating element 1 is inserted from the front and disposed as shown in FIG. 5. At this time, because a distance between the right and left first plate portions 2b and 3b is the same as a lateral length of the power generating element 1 with predetermined accuracy depending on working accuracy of the parts, the protruding ends of the metal foil of the groups 1d and 1e of metal foil protruding from the right and left end portions of the power generating element 1 come in contact with or close to the first plate portions 2b and 3b, respectively. Coming in contact or close refers to a state in which the entire protruding end of the metal foil comes in contact or close or a state in which part of the protruding end comes in contact and the other part comes close. In the case of the lid assembly 10 shown in FIG. 4, the power generating element 1 which is slightly twisted about a vertical axis may be inserted from below between the first plate portions 2b and 3b of the current collecting connectors 2 and 3 for the positive electrode and the negative electrode and may be untwisted to thereby be disposed similarly.

If the power generating element 1 is inserted and disposed from the front between the first plate portions 2b and 3b as shown in FIG. 5, the second plate portions 2c and 3c protruding toward the power generating element 1 from the first plate portions 2b and 3b are disposed to extend along the back outer side portions of the right and left groups 1d and 1e of metal foil of the power generating element 1, respectively. Therefore, by carrying out ultrasonic welding in such a manner as to sandwich the groups 1d and 1e of metal foil and the second plate portions 2c and 3c from the front and back sides, respectively, the respective layers of metal foil of the groups 1d and 1e of metal foil are brought into close contact with each other and are connected and fixed to the second plate portions 2c and 3c. As a result, the power generating element 1 is mounted to the lid assembly 10 with the positive electrode 1a connected to the positive terminal 4 through the current collecting connector 2 for the positive electrode and the negative electrode 1b connected to the negative terminal 5 through the current collecting connector 3 for the negative electrode.

Figure 6:
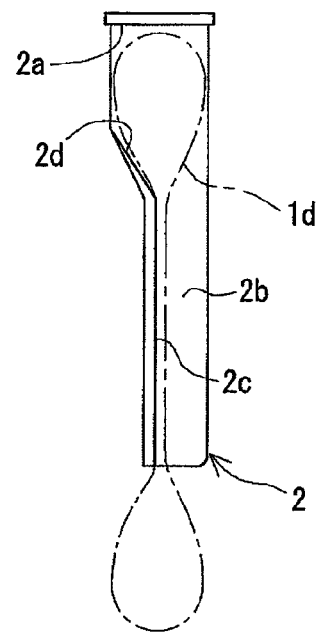
FIG. 6 is a left side view showing the embodiment of the invention and showing the structure of the current collecting connector for the positive electrode and disposition of the group of metal foil.

As shown in FIG. 6, because the second plate portion 2c (and the second plate portion 3c, similarly) is formed by bending the portion of the rectangular aluminum plate slightly narrower than the half of the original width of the aluminum plate, the second plate portion 2c is disposed at a position displaced toward a center side of layers of the metal foil by pushing and gathering the layers of the metal foil at the back outer side portion of the group 1d of metal foil and on the back side of the group 1d of metal foil toward the center side (front side). In other words, the second plate portion 2c is disposed at a substantially central portion in a front-back direction of the group 1d of metal foil. Then, the metal foil on the front side of the group 1d of metal foil is also pushed and gathered toward the center side (back side) of the layers by welding and comes in close contact on a front surface of the second plate portion 2c and therefore a side shape of the group 1d of metal foil is a shape of a gourd. Therefore, a balance between tensions applied to the front metal foil and the back metal foil is made and the front metal foil and the back metal foil are pushed and gathered toward the center only through halves of the thickness of the layers at a maximum and therefore it is possible to prevent application of excessive tension to part of the metal foil.

The power generating element 1 mounted to the lid assembly 10 is housed in the battery container 6 together with the current collecting connectors 2 and 3 for the positive electrode and the negative electrode. The lid plate 7 of the lid assembly 10 is fitted in the upper end opening portion of the battery container 6 and its periphery is welded to thereby close the upper end opening portion of the battery container 6. Then, the nonaqueous electrolyte secondary battery is completed by injecting a nonaqueous electrolyte solution from an electrolyte solution filling opening (not shown) provided to the lid plate 7 or the like and sealing the electrolyte solution filling opening.

According to the above structure, by merely inserting and disposing the power generating element 1 between the first plate portions 2b and 3b of the current collecting connectors 2 and 3, the protruding ends of the metal foil of the groups 1d and 1e of metal foil can be brought in contact with or close to the first plate portions 2b and 3b and the second plate portions 2c and 3c are disposed at the outer side portions of the groups 1d and 1e of metal foil. Therefore, the power generating element 1 can be positioned by merely adjusting its vertical position and welding of the groups 1d and 1e of metal foil and the second plate portions 2c and 3c can be carried out easily. In other words, the second plate portions 2c and 3c are disposed at only one outer side portions of the groups 1d and 1e of metal foil and no component members of the current collecting connectors 2 and 3 are disposed at the other outer side portions and therefore it is possible to easily position the power generating element 1 in this manner without bending or rupturing the metal foil.

Moreover, because the second plate portions 2c and 3c are provided only at vertical central portions of the back outer side portions of the groups 1d and 1e of metal foil as shown in FIG. 6 (though FIG. 6 shows only the second plate portion 2c, the second plate portion 3c is provided similarly), the second plate portions 2c and 3c are not disposed at opposite curved portions (vertical end portions) of the groups 1d and 1e of metal foil where the metal foil is curved, which provides adequate spaces not to apply stress to the opposite curved portions. Furthermore, the inclined portions 2d and 3d are connected to the upper ends of the second plate portions 2c and 3c to form no sharp edges and therefore the metal foil of the groups 1d and 1e of metal foil is not worn or ruptured by the upper end edges of the second plate portions 2c and 3c in welding. Moreover, the groups 1d and 1e of metal foil and the second plate portions 2c and 3c can be welded not at the protruding ends of the metal foil but on base portion sides and therefore burrs are not formed at the protruding ends of the metal foil and metal powder does not scatter.

By forming the lid assembly 10, the current collecting connectors 2 and 3 can be connected to the positive terminal 4 and the negative terminal 5 mounted to the lid plate 7 before connection of the current collecting connectors 2 and 3 to the power generating element 1 which is heavy and needs to be treated carefully and therefore the connecting work can be carried out easily.

The current collecting connectors 2 and 3 are not necessarily restricted to the structures in the above embodiment. For example, the terminal connecting portions 2*a* and 3*a* and the first plate portions 2*b* and 3*b* do not necessarily have to form right angles. Although the first plate portions 2*b* and 3*b* need to have the faces substantially along the respective protruding ends of the metal foil of the groups 1*d* and 1*e* of metal foil and the second plate portions 2*c* and 3*c* need to have the faces substantially along the outer side portions of the groups 1*d* and 1*e* of metal foil, the faces of the first plate portions 2*b* and 3*b* and the faces of the second plate portions 2*c* and 3*c* do not necessarily have to form right angles but angles close to right angles suffice. Furthermore, the faces of the first plate portions 2*b* and 3*b* and the faces of the second plate portions 2*c* and 3*c* do not necessarily have to be flat faces but may be curved faces along shapes of envelope faces of the respective protruding ends of the metal foil of the groups 1*d* and 1*e* of metal foil or curved faces along the outer side portions of the groups 1*d* and 1*e* of metal foil.

If the stress applied to the curves portions of the groups 1*d* and 1*e* of metal foil and tension applied to the metal foil do not become problems, the second plate portions 2*c* and 3*c* do not need to be disposed at vertical central portions and central portions in the front-back direction. Furthermore, if there is no fear of wear and rupture of the metal foil of the groups 1*d* and 1*e* of metal foil, the inclined portions 2*d* and 3*d* do not necessarily have to be provided. Moreover, the first plate portions 2*b* and 3*b* and the second plate portions 2*c* and 3*c* may be formed by joining separate metal plates by welding or the like. However, manufacturing cost is normally less expensive if the plates are formed by bending one metal plate as in the above embodiment.

Although the groups 1*d* and 1*e* of metal foil and the second plate portions 2*c* and 3*c* are connected by ultrasonic welding in the case shown in the embodiment, other kinds of welding such as resistance welding can be employed as well. Furthermore, it is essential only that the groups 1*d* and 1*e* of metal foil are connected to the second plate portions 2*c* and 3*c* by joining and therefore the method of joining is not limited to welding but other methods such as caulking and pinching by using pinching plates may be employed as well.

Although the battery container 6 and the lid plate 7 are made of the aluminum alloy in the case shown in the above embodiment, the material can be anything. For example, it is possible to use the battery container 6 and the lid plate 7 made of stainless steel. Furthermore, the battery container 6 and the lid plate 7 made of other materials can be used as well.

Although the positive terminal 4, the negative terminal 5, and the current collecting connectors 2 and 3 are mounted to the lid plate 7 while insulated in the case shown in the above embodiment, either one of the positive side and the negative side may not be insulated (only the positive terminal 4 can be mounted without being insulated when the lid plate 7 made of the aluminum alloy is used, for example, as in the above embodiment). If the lid plate 7 is made of insulating material, the insulating sealing materials 8 and 9 and the like are unnecessary.

Although the lid assembly 10 in which the positive terminal 4, the negative terminal 5, and the current collecting connectors 2 and 3 are mounted to the lid plate 7 is formed first in the above embodiment, the invention can be carried out similarly, if the current collecting connectors 2 and 3 are connected first to the power generating element 1. Furthermore, the invention can be carried out in either one of the current collecting connectors 2 and 3 for the positive electrode and the negative electrode. In these cases, unlike in the above embodiment, the power generating element 1 cannot be inserted between the first plate portions 2*b* and 3*b* of the current collecting connectors 2 and 3 mounted to the lid assembly 10. However, positioning can be carried out easily by adjusting vertical positions and lateral positions of the power generating element 1 or the current collecting connectors 2 and 3 and bringing the respective protruding ends of the metal foil of the groups 1*d* and 1*e* of metal foil in contact with or close to the first plate portions 2*b* and 3*b* instead.

Although the nonaqueous electrolyte secondary battery using the elliptic cylindrical winding power generating element 1 is shown in the above embodiment, other winding types such as oval cylindrical and cylindrical winding types may be employed as well. If the power generating element 1 is of the cylindrical winding type, however, at least one outer side portions of the groups 1*d* and 1*e* of metal foil are pressed flat along the second plate portions 2*c* and 3*c* and therefore the power generating element 1 in which a hard core material is inserted or the power generating element 1 in which electrodes are tightly wound to a central portion are not preferable, because it is difficult to press the outer side portions flat. Furthermore, the power generating element 1 may be of a layered type. In a case of the layered power generating element 1, a plurality of sheets of metal foil which are substrates of electrodes are layered and protrude as groups of metal foil from end portions. Moreover, the invention can be carried out similarly in secondary batteries and primary batteries other than the nonaqueous electrolyte solution secondary battery. Furthermore, the material of the sheets of metal foil which are the substrates of the electrodes of the power generating element 1 and the material of the current collecting connectors 2 and 3 are not limited to those in the above embodiment but can be changed suitably according to the type or the like of the battery.

INDUSTRIAL APPLICABILITY

The battery and the method of manufacturing the same according to the invention is extremely useful, because the work for joining the groups of metal foil of the power generating element and the current collecting connectors by welding or the like can be facilitated and workability can be improved in a manufacturing process of the battery.

EXPLANATIONS OF LETTERS OR NUMERALS

1 power generating element
1*a* positive electrode
1*b* negative electrode
1*c* separator
1*d* group of metal foil
1*e* group of metal foil
2 current collecting connector
2*a* terminal connecting portion
2*b* first plate portion
2*c* second plate portion
2*d* inclined portion
3 current collecting connector
3*a* terminal connecting portion
3*b* first plate portion
3*c* second plate portion
3*d* inclined portion
4 positive terminal
4*a* caulking pin 5 negative terminal
5a caulking pin
6 battery container
7 lid plate
8 insulating sealing material
9 insulating sealing material
10 lid assembly

The invention claimed is:

1. A battery comprising:
   a power generating element comprising layers of metal foils, the metal foils being substrates of electrodes, each metal foil comprising a protruding end and an outer side portion, the outer side portion comprising a first outer side and a second outer side that are opposite from each other;
   a current collecting connector, having:
      a first plate portion which is electrically conductive and comes in contact with or is close to the protruding end; and
      one second plate portion which is electrically conductive and protruding from the first plate portion toward the power generating element along one of the first and second outer sides of the outer side portion; and
   a terminal connected to the current collecting connector,
   wherein the current collecting connector is devoid of a plate portion that protrudes from the first plate portion toward the power generating element along the other of the first and second outer sides,
   the one of the first and second outer sides is joined to the second plate portion, the other of the first and second outer sides is completely exposed without being covered by the current collecting connector; wherein the second plate portion is protruded from the first plate portion to form an L-shape; and further comprising an inclined portion protruding from both the second plate portion and the first plate portion.

2. The battery according to claim 1,
   wherein the terminal is at least one of a positive terminal and a negative terminal mounted to a lid plate closing an opening portion of a battery container which houses the power generating element.

3. The battery according to claim 1,
   wherein the second plate portion of the current collecting connector is provided at a central portion of the outer side portion in a vertical direction along the outer side portion.

4. The battery according to claim 2,
   wherein the second plate portion of the current collecting connector is provided at a central portion of the outer side portion in a vertical direction along the outer side portion.

5. The battery according to claim 1,
   wherein the second plate portion of the current collecting connector is disposed in a position such that the second plate portion pushes the metal foils toward a center of the metal foils.

6. The battery according to claim 1,
   wherein the inclined portion has a triangular shape.

7. The battery according to claim 1,
   wherein the current collecting connector comprising a lateral portion and a vertical portion, the vertical portion comprising the first plate portion and the second plate portion.

* * * * *